Nov. 27, 1923.

T. J. PATE 1,475,863

PEDAL LOCK

Filed March 25, 1922

Thomas J. Pate
INVENTOR

BY Victor J. Evans
ATTORNEY

WITNESS:

Patented Nov. 27, 1923.

1,475,863

UNITED STATES PATENT OFFICE.

THOMAS JACKSON PATE, OF FORT SMITH, ARKANSAS.

PEDAL LOCK.

Application filed March 25, 1922. Serial No. 546,868.

*To all whom it may concern:*

Be it known that I, THOMAS J. PATE, a citizen of the United States, residing at Fort Smith, in the county of Sebastian and State of Arkansas, have invented new and useful Improvements in Pedal Locks, of which the following is a specification.

This invention relates to an automobile lock, the general object of the invention being to provide means for locking the pedals against movement.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
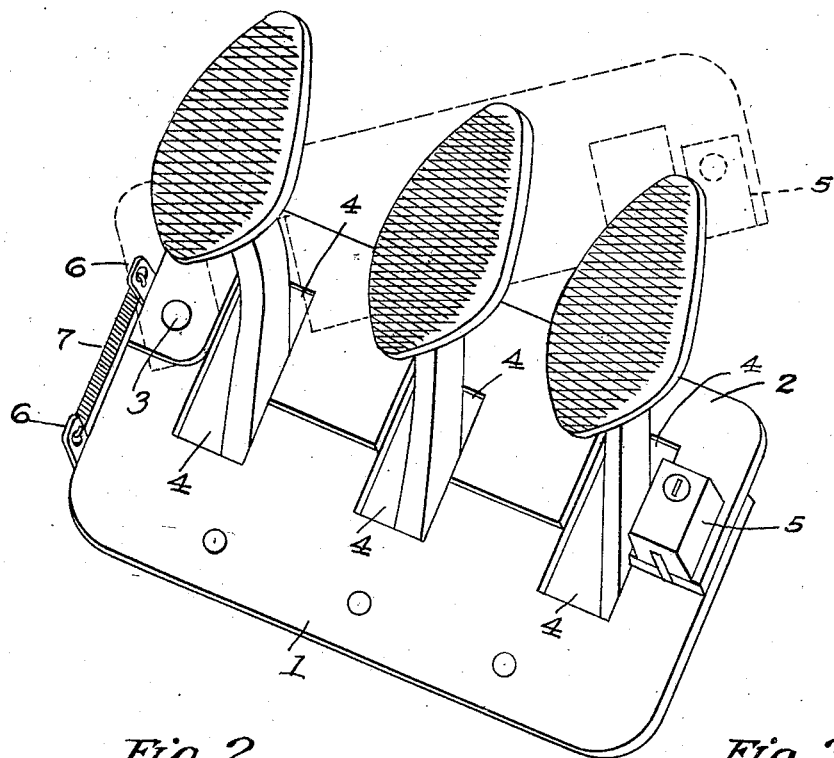
Figure 1 is a view showing the invention in use.
Figure 2:
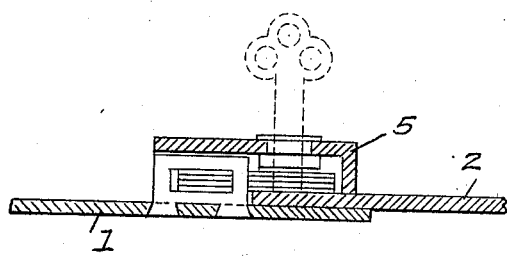
Figure 2 is a fragmentary transverse sectional view taken through the device showing the means for locking the plates together.
Figure 3:
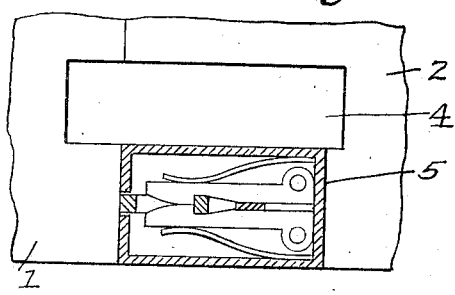
Figure 3 is a horizontal sectional view taken through the lock and showing the fragments of the plates.

As shown in these views the device comprises a plate 1 which is adapted to be secured to the floor boards of the car and a plate 2 which is hingedly connected with the plate 1, as shown at 3. Each plate is provided with a number of slots 4. The slots in one plate are in alignment with those in the other, when the plate 2 is in closed position, and these slots are so arranged that they will permit the pedals A of the automobile to pass through them but the slots are of such a size as to prevent movement of the pedals when the plate 2 is in closed position. The plate 2 is adapted to be locked to the plate 1 by means of the key operated lock 5 which is arranged at the end of the plate opposite to that which carries the hinge. Ears 6 are formed on the hinged ends of the plates to receive the ends of the spring 7 which tends to hold the plate 2 in open position.

It will thus be seen that when the plate 2 is in closed position the pedals cannot be moved so that it is impossible for the car to be operated. When the parts are unlocked the spring 7 will hold the plate 2 in open position so that the pedals can be operated.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An automobile lock of the character described comprising a plate adapted to be secured to the floor board of the automobile and being provided with a plurality of slots of the same size, a second plate pivotally secured to the first mentioned plate and being provided with slots corresponding in number with the slots of the first mentioned plate but said slots of the last mentioned plate being of different sizes for the accommodation of the irregular position of the pedals of the automobile, said last mentioned plate being adapted to overlap the first mentioned plate with the slots so arranged to bring them in perfect transverse alignment, a tongue formed on the lower plate, a key operated lock carried by the upper plate and being operatively associated with the tongue, an ear formed on the hinged end of each plate and a spring having its ends carried by the respective ears to force the plates to an open position.

In testimony whereof I affix my signature.

THOMAS JACKSON PATE.